Aug. 24, 1948.                    F. BERRY                    2,447,929
                    MULTISTAGE ROTARY FLUID POWER DEVICE
                        OF THE ROTARY ABUTMENT TYPE
Filed May 29, 1944                                      9 Sheets-Sheet 3

INVENTOR.
Frank Berry
BY
ATTORNEY

Aug. 24, 1948.  F. BERRY  2,447,929
MULTISTAGE ROTARY FLUID POWER DEVICE
OF THE ROTARY ABUTMENT TYPE
Filed May 29, 1944  9 Sheets-Sheet 5
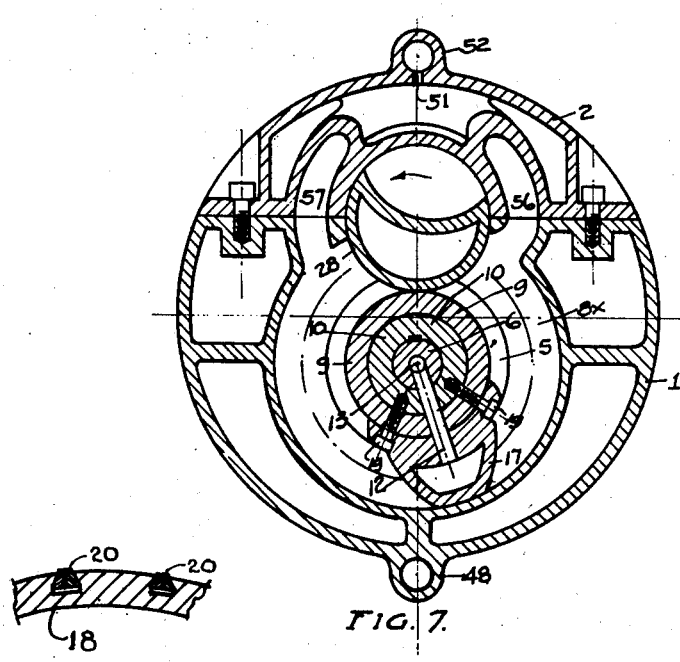
FIG. 7.
FIG. 8a
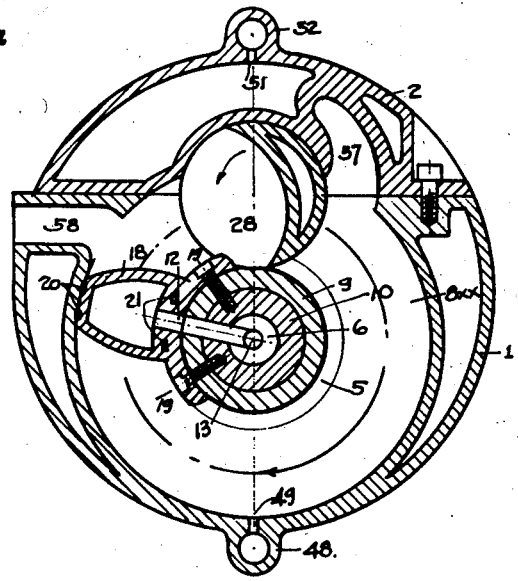
FIG. 8.
INVENTOR.
Frank Berry
BY
ATTORNEY.

Aug. 24, 1948.                F. BERRY                2,447,929
              MULTISTAGE ROTARY FLUID POWER DEVICE
                    OF THE ROTARY ABUTMENT TYPE
Filed May 29, 1944                              9 Sheets-Sheet 7

INVENTOR.
Frank Berry
BY
H. Lee Helms
ATTORNEY

Aug. 24, 1948.     F. BERRY     2,447,929
MULTISTAGE ROTARY FLUID POWER DEVICE
OF THE ROTARY ABUTMENT TYPE
Filed May 29, 1944     9 Sheets-Sheet 8

INVENTOR.
Frank Berry
BY
H. Lee Helm
ATTORNEY

Aug. 24, 1948.  F. BERRY  2,447,929
MULTISTAGE ROTARY FLUID POWER DEVICE
OF THE ROTARY ABUTMENT TYPE
Filed May 29, 1944   9 Sheets-Sheet 9

INVENTOR.
Frank Berry
BY
H. Lee Helms
ATTORNEY.

Patented Aug. 24, 1948

2,447,929

UNITED STATES PATENT OFFICE 2,447,929

MULTISTAGE ROTARY FLUID POWER DEVICE OF THE ROTARY ABUTMENT TYPE

Frank Berry, Corinth, Miss.

Application May 29, 1944, Serial No. 537,908

8 Claims. (Cl. 123—13)

The primary object of the invention is to provide a multi-stage fluid power transmitter, on the shaft of which are fixed a plurality of piston members, each operating in conjunction with a rotary abutment which serves as a direction and stage control for the fluid, the latter traveling in a continuous spiral, from intake to exhaust.

In one form of the invention, formed as internal combustion engine, the fuel gases are acted upon in a plurality of cylinders, providing stages for successive higher compression, and are passed under high compression to an initial combustion stage, the expanded gases of combustion, after action upon a rotary piston in the cylinder for such stage, being passed to and further expanded in a plurality of cylinders, therein acting upon rotary pistons.

Such compounding and staging is performed by the rotary pistons and abutments themselves without auxiliary valves.

In another form of the invention employing either right hand or left hand half of the engine a turbine improvement is provided. When in a turbine load is increased to the point where rotor speed becomes low, efficiency drops enormously. It is, therefore, necessary to maintain rotor speed beyond the critical factor and to employ reduction gearing to take care of the load. In my said form of the invention the reduction of piston speed by heavy load effects a building up of multi-stage cylinder pressures of varying volumes and reduction gearing is not required to maintain efficiency.

Thus, my motor may be operated efficiently by either internal combustion or fluid pressure, as for example, steam or air. Both fluid velocity and expansive force are employed with full efficiency in one case or the other, irrespective of rotor speeds.

In another form of my motor, employed as a multi-stage combustion engine, the gases, after action upon the piston of the initial firing cylinder, are passed to cylinders of successively greater area wherein the gases successively expand to greater volume in their piston rotation action. In conjunction with this, the invention contemplates employment of an automatic valve arrangement in the combustion gas flow-duct between the central firing cylinder and that second in line. The action of this valve is as follows:

In starting the engine and before pressure obtains throughout the combustion cylinders, the valve, which is spring loaded, remains open to enable flow of fuel gas from the first to the second combustion cylinder prior to firing. The fuel gas compressor thus feeds to two cylinders instead of one and thus the starting load is greatly reduced. Also, at low speeds the pressure of the expanding gases in the second stage cylinder may be reduced below the load of the valve spring and hence the valve will automatically open to reduce the compression ratio at a time when high compression is unnecessary and might tend to stall the engine. When higher speed is resumed the pressure in the second combustion cylinder will rise and the valve will automatically close.

In the use of my invention as an internal combustion engine, means are provided for carburetor fuel flow or solid fuel injection as when operation is of the Diesel type.

Also in the use of my invention as an engine with multi-stage firing cylinders preceded by multi-stage compression cylinders, the latter assembly is, in effect, an air compressor and may be used alone as such.

The invention includes employment of a single internally cooled abutment cylinder, formed with abutment passages for the pistons and having certain valve passages for timing control of compressed power fluid or combustion gases, or both, in accordance with the specific purpose of the general construction.

The invention provides a casing consisting of a main body, a detachable head, and two bolted-on end caps, the arrangement being such that upon removal of the head the abutment cylinder may be removed to expose the piston sleeves, the latter being bolted to the shaft, so that upon removal of the piston sleeve bolts the shaft may be withdrawn by endwise movement and the pistons removed.

In the use of the invention as an internal combustion engine with fuel compression means ahead of the initial combustion cylinder, the fuel gas is compressed into a pre-combustion chamber and flow of the fired gases into the first combustion cylinder is controlled by the appropriate rotary abutment itself and in such manner that at the instant of firing the passage between the pre-combustion chamber and the combustion cylinder is a narrow throat which quickly progresses in width as the fired gases expand to greater volume and pressure.

Further objects of the invention will hereinafter appear in this specification, with reference to the accompanying drawing, in which—

Figure 7 is a transverse sectional elevation on the line 7—7, Figures 1 and 2, and through the second combustion cylinder.

Figure 8 is a transverse sectional elevation on the line 8—8, Figures 1 and 2, and through the third combustion cylinder.

Figure 8a is an enlarged view of a portion of Figure 8.

The casing

Figure 2:
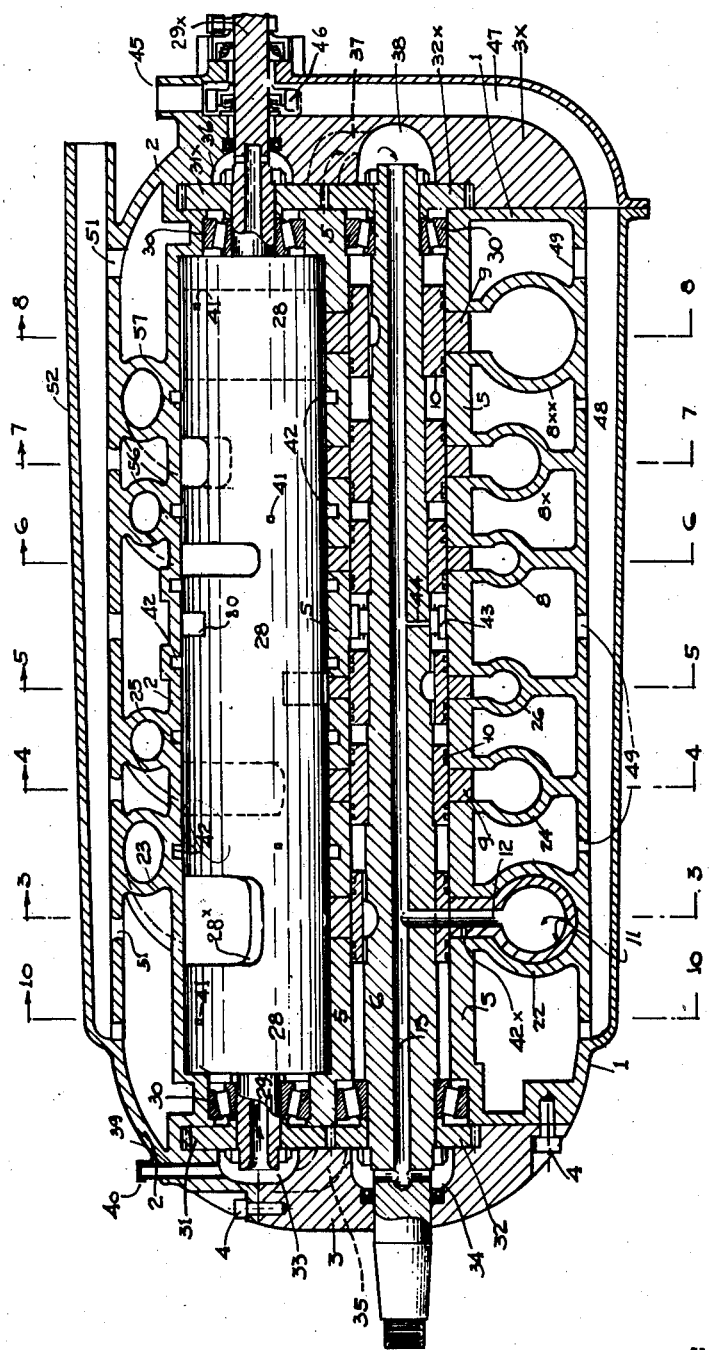
Figure 2 is a vertical section on the line 2—2, Figure 1.
Figure 9:
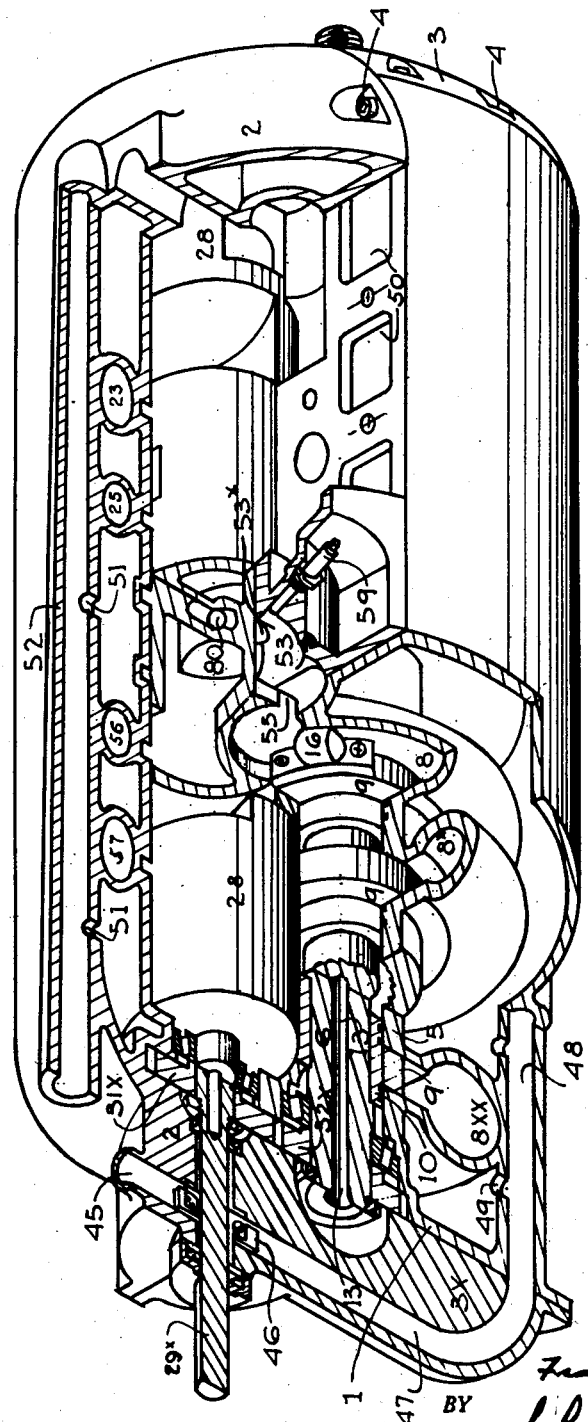
Figure 9 is a sectional isometric view of the structure shown in Figure 1.

Referring to Figures 2 and 9, it will be seen that the casing consists of a main body 1, a removable head 2 and an end cap 3. Bolts 4 secure the head and cap to the main body of the casing.

The cylinders

Integrally cast in the casing main body 1 are the fuel compression and the combustion cylinders. These cylinders are immediately carried by outer and inner curvilinear walls, the outer wall being that of the casing 1 and the inner wall 5 being a housing for the main or driven shaft 6.

Referring to Figure 2 it will be seen that when my invention is in the form of an internal combustion engine, a plurality of multi-stage compression cylinders, 22, 24, 26, and a plurality of multi-stage combustion cylinders 8, 8×, 8××, will be employed. At each cylinder the wall of shaft housing 5 is cut away for projection into the cylinder of the appropriate piston and its sleeve carrier which encircles the shaft 6.

It will be seen that the compression cylinders 22, 24, and 26, are successively decreased in area and that the combustion cylinders 8, 8×, and 8×× are successively increased in area, for functions later to be described herein.

The pistons

Each of the pistons may be constructed in the manner illustrated in Figures 3 to 8, inclusive. The pistons themselves are given separate numeral designations for convenience of description, but their hubs and carrying rings, the latter being keyed to shaft 6, are all indicated at 9 for the hubs and 10 for the carrying rings.

Figure 3:
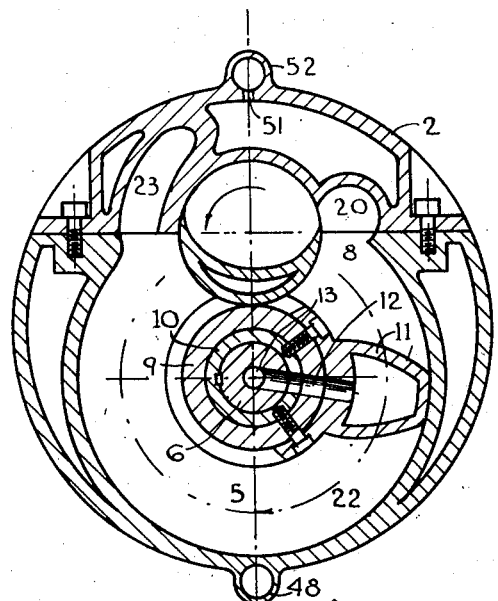
Figure 3 is a transverse sectional elevation on the line 3—3, Figures 1 and 2, showing the first compression cylinder, its piston and its abutment.

The initial compression piston is indicated at 11 and reference to Figures 2 and 3 will show that it is hollow to receive a cooling fluid from registering ducts at 12 leading to a longitudinal flow passage 13 in and axially of shaft 6. Each of the remaining piston assemblies is formed in the same manner and is so indicated by reference characters.

The second stage compression piston is indicated at 14 and the third stage compression piston at 15.

The first stage combustion-cylinder piston is indicated at 16, the second stage piston at 17 and the third stage piston at 18. Each piston includes an integral curved base projecting forwardly and rearwardly of the outer main piston body, which base acts as a secondary piston area and which co-acts with the abutment at certain moments for better sealing.

The base plate of each piston receives bolts 19 which are threaded through hubs 9 and into the rings 10, the latter being keyed to shaft 6 as aforesaid.

I prefer that the cylinders be round in cross section so that all of the pistons may carry round overlapped end piston rings. In Figure 8 the position of two piston rings is indicated at 20, apertures at 21 being formed in the base of the piston for passage of the rings at such area.

The abutment rotor

The hollow abutment rotor may be of one piece construction, and is so shown in the drawings at 28, particularly in Figures 2 and 9. The walls of the cylinders are extended upwardly to form a seat for the abutment rotor and the seat between the pistons and at each end is half round.

The abutment rotor is formed with transverse passageways, one for each piston. The passageway may have flat side walls merging into a curved transverse wall 28×.

Driving, cooling, and lubrication of abutment rotor

At each of its ends, the abutment rotor carries a shaft, the shafts being shown at 29, 29×. The curvilinear seat afforded by the shaft housing 5 supports bearings 30 for the shafts. Keyed to the shafts are two gears 31, 31×, driven by gears 32, 32×, keyed to main shaft 6. As stated, the abutment rotor is hollow; and shaft 29 is longitudinally bored to receive cooling fluid, oil being preferred, from an oil-receiving cup at 33, Figure 2, which extends partly into the casing head 2 and partly into end cap 3. The oil in cup 33 is received by the pumping action of gears 31, 32 from a second receiving cup at 34, surrounding main shaft 6. A duct at 35 communicating with the gear intermeshing area permits such cup to cup flow. The oil is pumped through shaft 29, into the hollow abutment, and out the latter through a short bore in shaft 29 which communicates with a cup at 36 adjacent gear 31×. The pump action of gears 31× and 32× effects a flow of the oil through a duct 37 to a cup at 38 and thence through shaft 6 to receiving cup 34, completing the circulation. Fresh oil may be admitted to the closed flow circuit through filler tube 39 normally closed as by a threaded cap 40.

For lubrication of the abutment rotor, the latter is provided with a suitable number of oil out-flow ports 41, Figure 2, so that oil may be forced out of these ports and intermediate the rotor and its confining wall, the upper half of which is the arcuate web 2ˣ of removable head 2. Channel-ways at 42 are formed in such confining wall for receiving sealing rings of any suitable form.

The bore 12 of each piston assembly may have a lateral duct at 42ˣ (Figure 2), such ducts providing for passage of oil to the inner face of each cylinder so as to maintain a film of oil thereon. Shaft bearings such as that at 43, Figure 2, may be similarly lubricated (vide duct 44).

Cooling of pistons

The oil in the said closed circuit flows through longitudinal bore 13 of the main shaft 6. Each hollow piston assembly has its base area bored through, as shown at 12, Figure 2, and the shaft 6 is correspondingly bored so that oil flow through the piston is provided.

Cooling of the cylinders

Figure 4:
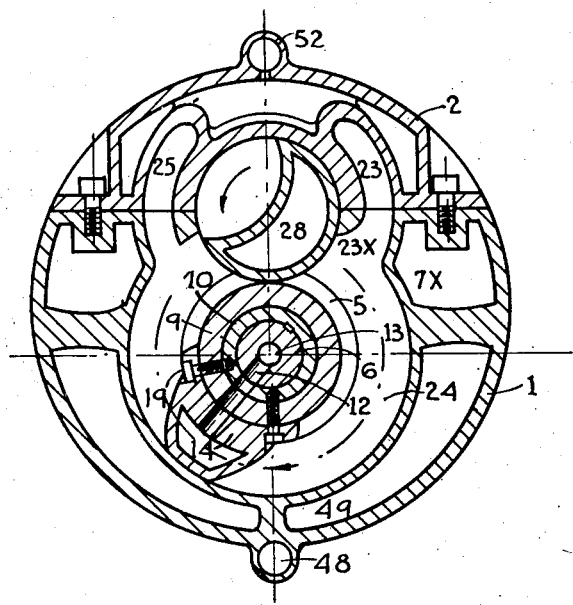
Figure 4 is a transverse sectional elevation on the line 4—4, Figures 1 and 2, and through the second compression cylinder.
Figure 5:
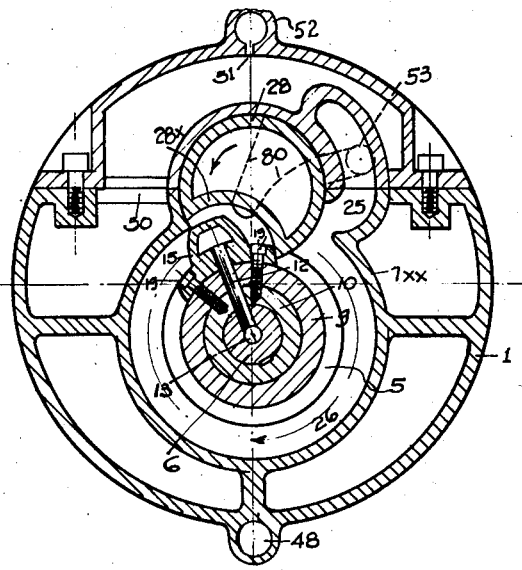
Figure 5 is a view similar to Figure 4 on the line 5—5, Figures 1 and 2, and through the third compression cylinder.

Referring to Figures 2, 4, and 9, it will be seen that cooling water flows into the casing via pipe 45 and meets water pump or impeller 46. The water is forced through duct 47 in end cap 3ˣ and thence horizontally through casing bore duct 48 and upwardly through ports 49. The water rises in the casing about the cylinder walls and flows upwardly into the water chambers of the head 2 through ports such as 50 (Figures 5, 9, 12, 13).

The water finally rises through ports at 51 in the head 2 and communicating with outlet pipe 52 leading to the top of a radiator (not shown).

Flow passageways between cylinders

The construction illustrated in the drawing being an embodiment particularly adapted for use as an internal combustion engine, having three compression stages and three combustion stages, there are provided two sets of flow passages, cast in the casing head 2, one set affording communication between the compression cylinders, and the second set providing communication between the combustion cylinders. The arrangement is such that as the fuel gas or air flows from the initial compression cylinder to the compression cylinders of the next stages, the flow is not only in a spiral path which includes the cylinders, but a path in which the passageway areas are progressively decreased for higher compression of the air or gas. Thus the means for such continuous flow compression includes not only the cylinders and their pistons, but the flow passage-ways in the casing head.

Figure 14:
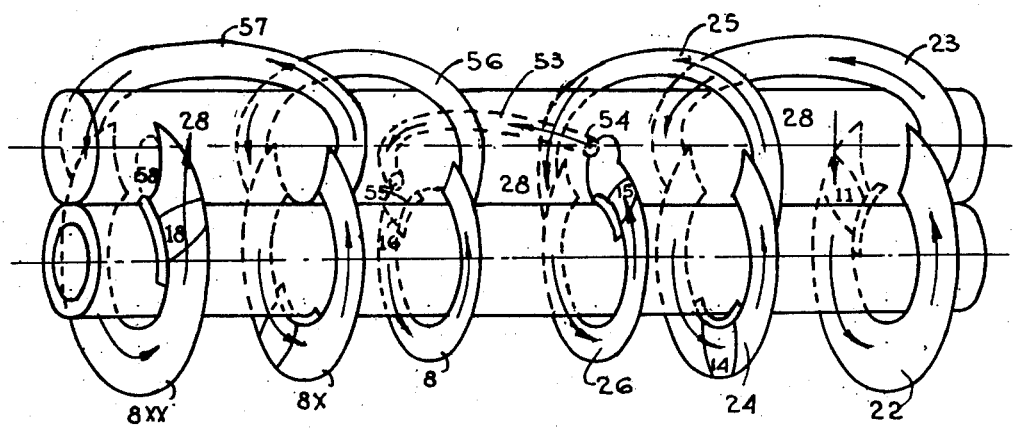
Figure 14 is a schematic view illustrating the flow of fuel compression and combustion gases relatively to the compression and combustion stages of an engine.

Before a description of detailed operation, the above factors will be understood by reference to the schematic view, Figure 14. In that figure the cylinders and their respective pistons, together with the rotor abutment and the casing head spiral passageways, are schematically shown. It will be seen that the discharge end of the first compression cylinder 22 is brought into communication with casing head passageway 23, the latter being progressively decreased in area until it communicates with the inlet end of cylinder 24. Also the discharge end of the latter cylinder directly communicates with the receiving end of spiral passageway 25, the latter decreasing in area until its communication with the inlet end of the final compression cylinder 26.

At the point of highest compression, i. e., at the discharge end of compression cylinder 26, the air or fuel gas is held in highly compressed condition within a pre-combustion and firing chamber 53. The inlet port 54, therefor, having been closed by abutment rotor 28, whereas, the outlet at 55 has remained in restricted communication with the top of piston 16 in the first firing cylinder 8. When firing takes place in the pre-combustion chamber 53, the said restricted passageway 55 is progressively opened wide by the rotation of the abutment rotor, and the expanding gases give full pressure upon piston 16, with a power impulse upon the driven shaft until piston 16 passes the inlet of spiral passageway 56, and the expanding fuel gases flow in their spiral path into the second stage combustion cylinder 8ˣ for action upon piston 17 therein. Spiral passageway 56 is of gradually increasing area. From cylinder 8ˣ, with its own increased area, the expanding gases discharge into spiral passageway 57, which increases in area until it communicates with the final stage combustion cylinder 8ˣˣ, acting upon the piston 18 therein, until the latter passes discharge port 58, and the burnt gases flow out.

Figure 10:
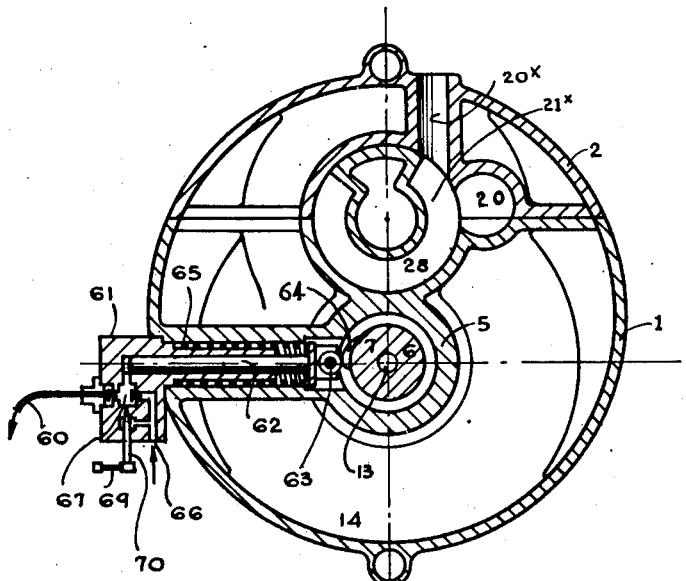
Figure 10 is a transverse section on the line 10—10, Figures 1 and 2.

Referring to Figure 3 (the initial compression unit), and Figure 10, it may be assumed for purposes of description that the inlet chamber 20 is in communication with a fuel carburetor (not shown), connected to pipe 20ˣ (Figure 10). In the clockwise movement of the piston 11 fuel gas will be drawn into the compression cylinder 22 from the carburetor. In the next cycle, piston 11 passes through the abutment opening, and the abutment at such time closes the duct 21ˣ leading to fuel inlet chamber 20 from the carburetor.

When the piston 11 passes through the abutment and continues to move clockwise, the said first charge of fuel gas is compressed and transferred to compression cylinder 24, whilst a new charge of fuel is drawn in rearwardly of said piston 11.

The transfer of fuel gas from cylinder 22 to cylinder 24 is via spiral passageway 23 having a discharge end 23ˣ at the receiving end of compression cylinder 24.

Reference to Figures 3 and 4 will show the relative positions of the two pistons 11 and 14 and their abutments during such fuel transfer.

The fuel gas transfer from cylinder 24 is via spiral passageway 25 to cylinder 26.

The compression cylinders are successively reduced in diameter and their spiral passageways progressively reduced in area in accordance with ratio of compression desired.

The gases are directed forwardly in continuous spiral flow to the pre-combustion chamber for first combustion cylinder 8, by the coaction of the pistons and abutments, and no reverse flow is possible. Thus, referring to Figure 3 the solid wall of the abutment opposite the clearance passageway thereof closes the cylinder 22 at its upper area until the piston begins to enter said passageway; and the same condition is present as to all of the cylinders. Also, in each compression stage, as the fuel gas is being compressed ahead of the first compression cylinder into another cylinder, the piston of the latter retracts and finally meets and passes the inlet port to trap in the gas preliminary to imposing an added compression thereto.

Solid fuel injection

When the engine is to be operated with solid fuel injection, the multi-stage compressors will act upon air and the solid fuel will be injected into the pre-combustion chamber 53 as by an injector 59, communicating by tube 60, with a solid fuel injector pump 61 (Figure 10). Any suitable injector pump may be employed. That illustrated consists of a casing bored to receive a piston 62 carrying a roller contact member 63 for engagement by the cam 64 on main shaft 6. A spiral spring 65 acting on the piston normally holds the latter in retracted position. The fuel from a source of supply enters the injector pump through a port 66. It will be under pressure sufficient to unseat a check valve and fill a measuring chamber 67 in communication with the chamber of piston 62. In the active stroke of the piston the latter forces out a charge of fuel by solid injection to and through the injector 59, as will be understood without further explanation.

Figure 1:
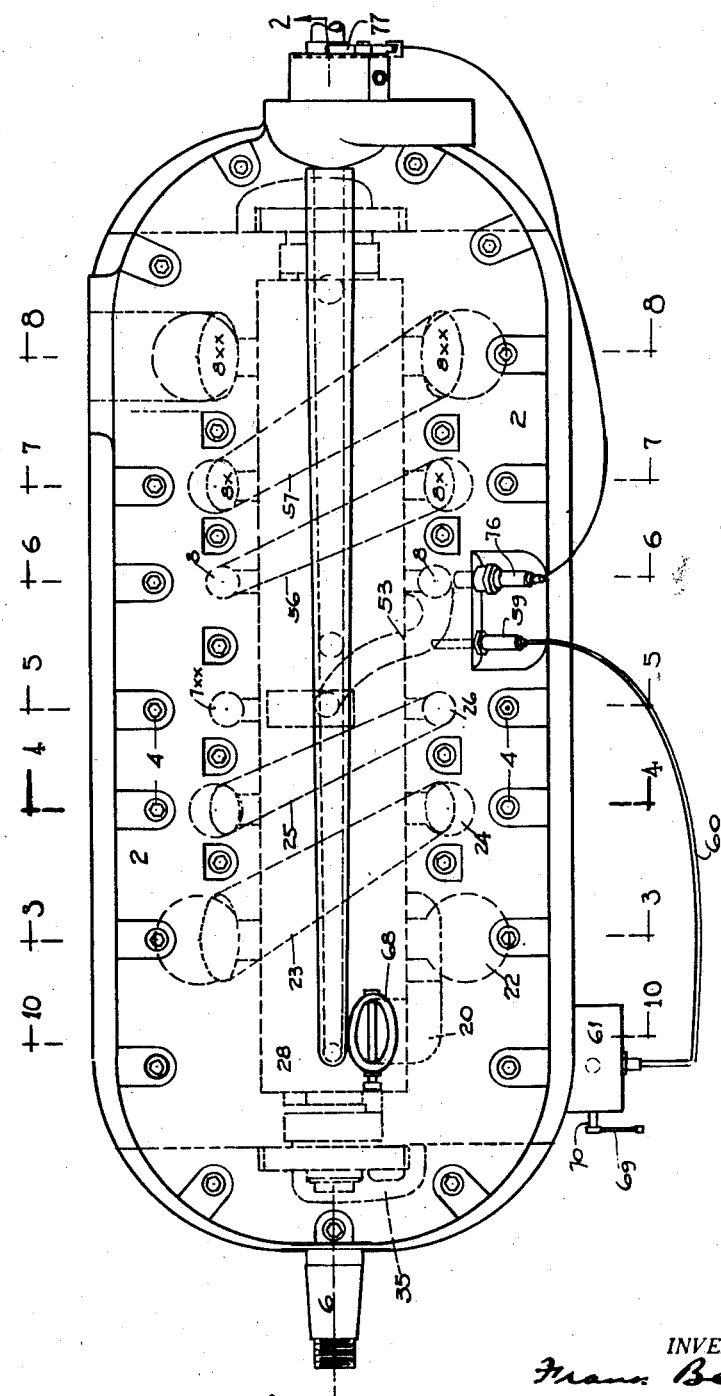
Figure 1 is a plan view of an embodiment of the invention partly in dotted lines.

In the use of the solid injection of fuel method the amount of air admitted and compressed is controlled by a butterfly valve, controlling air inlet 20$^\times$, the valve being shown at 68, Figure 1, and this valve is suitably connected to a lever 69 on a needle valve 70. When the butterfly valve is moved to position for idling of the motor, needle 70 will be automatically adjusted to by-pass part of the fuel acted upon by piston 62, in the usual manner; and when the butterfly valve is positioned for high speed, needle valve 70 will be automatically moved to closed position.

Figure 11:
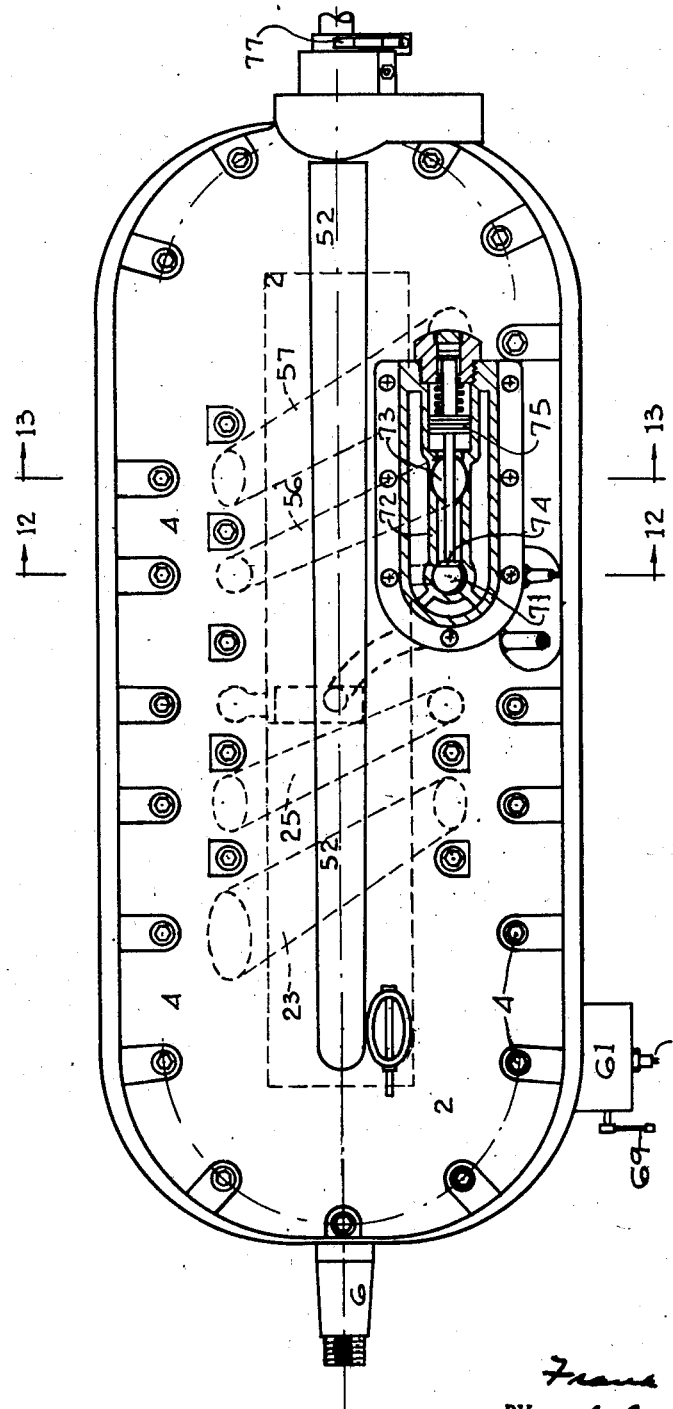
Figure 11 is a plan view of a modified embodiment partly in section and partly in dotted lines, the section being through a valve device and on the line 11—11, Figure 12.
Figure 13:
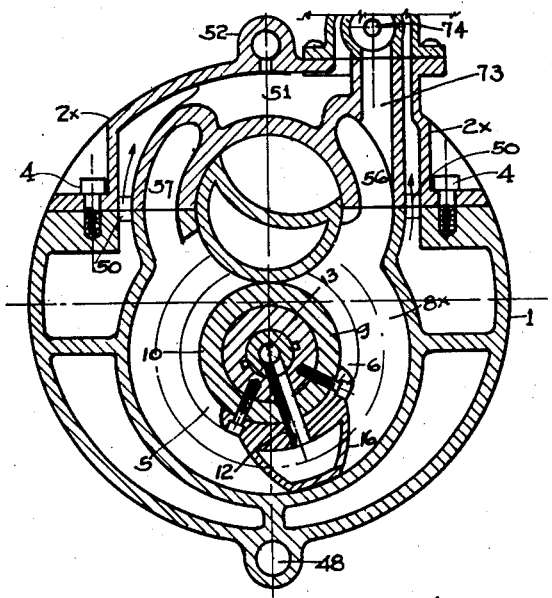
Figure 13 is a sectional elevation on the line 13—13, Figure 11, and through a second combustion cylinder connected to the first cylinder by said valve device.
Figure 12:
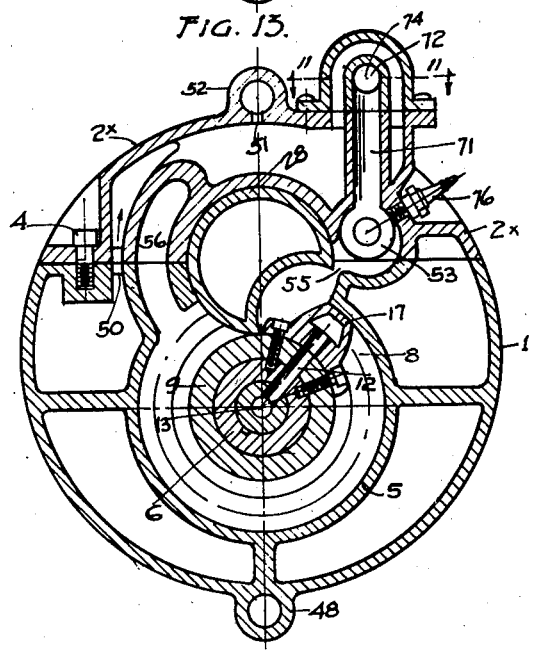
Figure 12 is a sectional elevation on the line 12—12, Figure 11, and through an initial combustion cylinder equipped with said valve device.

In order to make starting easy, and for better control of idling and other low speeds, means are provided for effecting direct injection of either air or fuel gas, as the case may be, into the first two of the combustion cylinders simultaneously, and by automatic action when the pressure in the second stage combustion cylinder 8$^\times$ reaches a pre-determined minimum. Such means is as follows: Rising from the end of the combustion cylinder which communicates with the pre-combustion chamber, that is to say from combustion cylinder 8, is a vertical duct 71 in communication with a horizontal valve chamber 72 (Figures 11 and 12). In the valve chamber is a port at 73 communicating with a spiral passageway 56. Normally closing communication between the said first and second combustion cylinders, 8 and 8$^\times$ is a poppet valve 74 (Figures 11 and 13) carried by a spring loaded piston 75. The spring is of such load as to overcome relatively low pressure received on piston 75 from second stage combustion chamber 8$^\times$, so that at low speeds, as at starting, poppet valve 74 will be pushed forward by the spring, and the compressed gases or air entering the pre-combustion chamber 53 will pass to both the first and second stage combustion cylinders, and communication between them will be left open at the firing instant and until pressure in the second stage combustion cylinder rises above a pre-determined minimum.

*Ignition and control of fuel gas flow to pre-combustion chamber*

Figure 6:
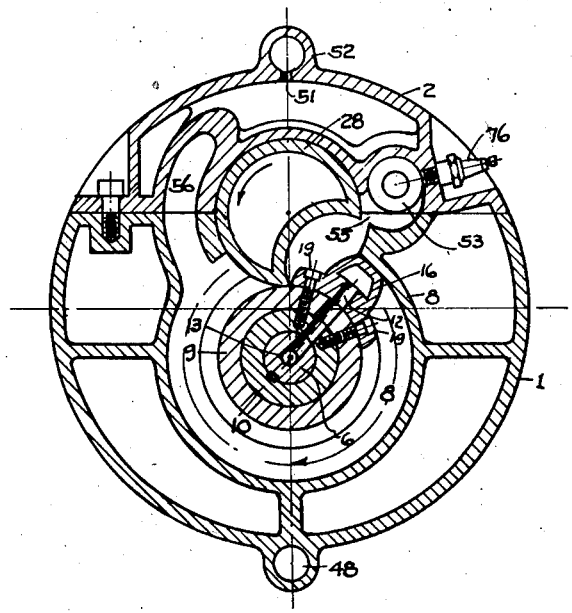
Figure 6 is a transverse sectional elevation on the line 6—6, Figures 1 and 2, and through the first combustion cylinder.

A spark plug 76 having its operative end threaded into the pre-combustion chamber may be connected to a timing contact-point device diagrammatically indicated as on the main shaft at 77 (Figure 11), and which timing device will receive high-tension current from a coil and generator, or battery, in the usual manner. The position of the piston 16 in the first combustion chamber 8, at the instant of firing, is shown in Figures 6 and 9. At firing, communication between final stage compression cylinder 26 and the pre-combustion chamber is cut off by the closing of a duct 80 leading from below the arcuate wall 28$^\times$ of the abutment, through the abutment (see Figures 5 and 9) between oil receiving cooling areas thereof to and out the periphery. Just prior to firing, this peripheral opening registers with the inlet 53$^\times$ of pre-combustion chamber 53 and the fuel gas is forced under high pressure into the chamber and part flows through the restricted opening at 55 into the first combustion cylinder 8 (see Figure 6).

At this instant firing takes place and by the continued movement of the abutment rotor 28, the passageway at 55 is progressively increased in size for full flow of the expanding gases.

*Operation as a compressor*

It will be obvious that the multi-stage compression assembly alone, may be employed as a highly efficient complete fluid compressor unit. In such case, the main shaft will be driven and the so-called pre-combustion chamber will be a duct of suitable form leading out of the casing for discharge of the compressed fluid.

*Operation as an expanding-fluid engine*

It also will be obvious that the multi-stage combustion assembly, comprising the cylinders 8, 8$^\times$, 8$^{\times\times}$, and their pistons, rotary abutment section and spiral ducts, may be operated as a unit air or steam engine. In such case, the fluid under pressure from a suitable source will be admitted to the so-called pre-combustion area for controlled flow first to the cylinder 8 and, as described, to the subsequent stages for final discharge from the ultimate expansion cylinder, the shaft 6 thus being power rotated by the fluid.

*Operation as a full Diesel*

The multi-stage compression of air may readily be so proportioned to the solid fuel injection that upon each active stroke of the injector, the pressure-temperature of the air in the pre-combustion chamber may effect Diesel firing of the charge. In such case, it will generally be desirable to reduce the fuel-gas holding area, consisting of pre-combustion chamber and the area between piston 16 (Figure 6) and its co-acting curved abutment wall, at the instant of firing, over that employed when carburetion and spark ignition is employed.

It will be understood that the number, form, and specific relation of the multi-stage cylinders and their pistons and abutment members may be widely varied without departure from the spirit of the invention; also, that the form of the casing, the cooling means, lubricating means and the auxiliaries may be modified as desired.

What I claim and desire to secure by Letters Patent is as follows:

1. A fluid power transmitter comprising a casing, a continuous spiral passage in said casing, including two sets of cylinders, the cylinders of the first set being of progressively decreased diameters, and the cylinders of the second set being of progressively increased diameters, a shaft coaxial with the cylinders, pistons on the shaft and in the cylinders, means co-acting with said pistons to control the fluid flow between cylinders, a pre-combustion chamber affording communication between the two sets of cylinders, the fluid flow control means between the cylinders including means adjacent the outlet end of the pre-combustion chamber for progressively opening communication between said chamber and the initial cylinder of the second set of cylinders, subsequent to a pre-determined instant of firing, determined by the position of the piston in said initial cylinder of the second set.

2. A fluid power transmitter constructed as an internal combustion engine, comprising a casing, two sets of cylinders in said casing, the cylinders of the first set being of progressively decreased diameter, and the cylinders of the second set being of progressively increased diameter, a shaft coaxial with the cylinders, pistons on the shaft and in the cylinders, and means for controlling communication between the pistons of each set, and between the final compression cylinder and the initial expansion cylinder, comprising a cylindrical rotor formed with a plurality of clearance passageways and curvilinear abutment walls for the pistons, a duct leading from below the curvilinear abutment wall of the final compression cylinder to the periphery of the abutment rotor, the peripheral opening of said duct adapted to register with the inlet of a chamber communicating with the first expansion cylinder.

3. A fluid power transmitter constructed as an internal combustion engine, constructed in accordance with claim 2, in which the periphery of the abutment rotor near one end thereof is channeled and in communication with a fluid inlet passageway through the casing, and also with a duct leading to the initial compression cylinder, the wall of the abutment rotor intermediate the ends of said channel forming a timing closure valve for said ducts, and the channelway of said abutment rotor forming a timing opening valve for said ducts.

4. A fluid power device comprising a shaft, annular cylinders of progressively different cubic capacities arranged in axial alignment about the shaft, pistons mounted on the shaft and in said cylinders, an abutment rotor parallel to the shaft and having recesses therein to clear the pistons as they pass the abutment rotor, and a passageway between adjacent cylinders, said passageway being of progressively varying cross sectional area throughout its length.

5. A fluid power device comprising a shaft, annular cylinders of progressively different cubic capacities arranged in axial alignment about the shaft, pistons mounted on the shaft and in said cylinders, an abutment rotor parallel to the shaft and having recesses therein to clear the pistons as they pass the abutment rotor, and a passageway between adjacent cylinders, said passageway extending around the abutment rotor entirely exteriorly of the periphery thereof and adjoining said adjacent cylinders in substantial alignment with the flow of fluid therein.

6. A fluid power device comprising a shaft, annular cylinders of progressively different cubic capacities arranged in axial alignment about the shaft, pistons mounted on the shaft and in said cylinders, an abutment rotor parallel to the shaft and having recesses therein to clear the pistons as they pass the abutment rotor, and a passageway between adjacent cylinders, said passageway extending around the abutment rotor and adjoining said adjacent cylinders in substantial alignment with the flow of fluid therein, and being of progressively varying cross sectional area throughout its length.

7. A fluid power device comprising a shaft, annular cylinders of progressively different cubic capacities arranged in axial alignment about the shaft, pistons mounted on the shaft and in said cylinders, an abutment rotor parallel to the shaft and having recesses therein to clear the pistons as they pass the abutment rotor, and a passageway between adjacent cylinders, said passageway extending around the abutment rotor entirely exteriorly thereof, and the centerline of said passageway lying substantially entirely in a vertical plane passing through the points of connection of the passageway wtih the centerlines of said adjacent cylinders.

8. A fluid power device comprising a shaft, annular cylinders of progressively different cubic capacities arranged in axial alignment about the shaft, pistons mounted on the shaft and in said cylinders, an abutment rotor parallel to the shaft and having recesses therein to clear the pistons as they pass the abutment rotor, and a passageway between adjacent cylinders, the centerline of said passageway lying substantially entirely in a vertical plane passing through the points of connection of the passageway with the centerlines of said adjacent cylinders, and said passageway being of progressively and uniformly varying cross sectional area throughout its length.

FRANK BERRY.

REFERENCES CITED

The following references are of record in the file of this patent:

UNITED STATES PATENTS

| Number | Name | Date |
| --- | --- | --- |
| 406,317 | Vaile | July 2, 1889 |
| 619,004 | Tygard | Feb. 7, 1899 |
| 646,151 | Le Rond | Mar. 27, 1900 |
| 655,201 | Cooper | Aug. 7, 1900 |
| 1,257,268 | Martin | Feb. 19, 1918 |
| 1,282,518 | Althause | Oct. 22, 1918 |
| 1,311,858 | Fischer | July 29, 1919 |
| 1,344,331 | Carrey | June 22, 1920 |
| 1,919,355 | Bancroft | July 25, 1933 |
| 2,070,631 | Sunderland | Feb. 16, 1937 |
| 2,273,625 | Concannon | Feb. 17, 1942 |

FOREIGN PATENTS

| Number | Country | Date |
| --- | --- | --- |
| 9,629 | Great Britain | May 25, 1900 |
| 27,284 | Great Britain | Nov. 30, 1906 |
| 14,335 | France | Sept. 18, 1911 |
| | (Addition to No. 417,342) | |